United States Patent [19]

Wahl, III

[11] 4,357,801

[45] Nov. 9, 1982

[54] REMOVAL OF CARBON DIOXIDE IN GEOTHERMAL POWER SYSTEMS

[75] Inventor: Edward F. Wahl, III, Claremont, Calif.

[73] Assignee: Occidental Research Corporation, Irvine, Calif.

[21] Appl. No.: 114,386

[22] Filed: Jan. 22, 1980

[51] Int. Cl.³ .............................................. F03G 7/00
[52] U.S. Cl. .................................. 60/641.3; 60/641.2; 60/646
[58] Field of Search ................. 60/641.2, 641.3, 641.5, 60/646, 657; 165/45

[56] References Cited

U.S. PATENT DOCUMENTS

| | | | |
|---|---|---|---|
| 3,951,794 | 4/1976 | Swearingen | 60/641.2 X |
| 4,089,175 | 5/1978 | Woinsky | 60/641.3 |
| 4,123,506 | 10/1978 | Spevack | 60/641.2 X |

Primary Examiner—Allen M. Ostrager
Assistant Examiner—Stephen F. Husar
Attorney, Agent, or Firm—Barry A. Bisson; Max Geldin

[57] ABSTRACT

A process for removing carbon dioxide in geothermal power generating processes employing a geothermal fluid such as geothermal brine containing carbon dioxide, to improve the efficiency of geothermal power generation, comprises introducing an aqueous alkaline solution, preferably an aqueous calcium hydroxide solution, into a vapor stream obtained from the brine during power generation, to remove carbon dioxide from the stream. In the case, for example, of power generation by direct contact heat exchange between geothermal brine and a working fluid such as isobutane, where the working fluid is expanded to generate power, aqueous calcium hydroxide can be introduced into a direct contact condenser into contact with the working fluid therein to remove $CO_2$ present in the working fluid, thereby aiding in reducing loss of working fluid from the system and aiding in reducing pump power. The aqueous alkaline, e.g., calcium hydroxide, solution alternatively can be contacted with the geothermal fluid prior to flashing or prior to direct contact heat exchange with a working fluid, to remove $CO_2$ from uncondensible gas contained in the fluid.

14 Claims, 4 Drawing Figures

REMOVAL OF CARBON DIOXIDE IN GEOTHERMAL POWER SYSTEMS

BACKGROUND OF THE INVENTION

This invention relates to the removal of carbon dioxide in geothermal power generating processes employing a geothermal fluid such as geothermal brine containing $CO_2$, to improve the efficiency of geothermal power generation, and is particularly concerned with a process and system of the above type, e.g., employing direct contact heat exchange between a hot geothermal fluid and a working fluid such as a hydrocarbon, wherein vapors containing working fluid and uncondensible gas including carbon dioxide, are treated with a chemical treating agent to remove the carbon dioxide (and other undesirable constituents, if present, such as $SO_2$ or $H_2S$), and reduce working fluid losses, and improving the efficiency of geothermal power generation.

U.S. Pat. No. 3,988,895 to Sheinbaum, and application Ser. No. 589,068, filed June 23, 1975, by Samuel G. Woinsky now abandoned in favor of U.S. Application Ser. No. 76,677, filed Sept. 19, 1979, now U.S. Pat. No. 4,324,102 (the disclosure of which is incorporated herein), disclose recovery of energy from geothermal brine by passing such geothermal brine under pressure into direct heat exchange contact with a working fluid such as isobutane, expanding the resulting hot working fluid or isobutane in a work expander or a turbine to produce work, condensing the turbine discharge, and returning the resulting condensed working fluid to the heat exchanger, and withdrawing the spent brine from the column and discarding same as by introducing the spent brine into a brine injection well.

The geothermal brine generally contains uncondensible gas, including carbon dioxide, as well as other uncondensible gasses such as a small amount of hydrogen sulfide. Non-condensible gasses such as carbon dioxide are responsible for appreciable losses in the efficiency of geothermal power generating systems. It is thus desirable for increased efficiency of power generation and economical operation for geothermal power generation, to reduce the amount of uncondensible gas, particularly carbon dioxide, as much as possible (at a reasonable cost), in order to reduce working fluid losses resulting from venting of working fluid vapors together with the uncondensible gas, particularly $CO_2$, during operation of the system. In the above patent, and in above U.S. Application Ser. No. 76,677, now U.S. Pat. No. 4,324,102, and also in U.S. Application Ser. No. 8,793, filed Feb. 1, 1979 by Samuel G. Woinsky, now U.S. Pat. No. 4,279,125 (the disclosure of which is incorporated herein), the geothermal fluid or brine is initially degassed, as by steam stripping or by flashing, whereby steam and uncondensible gas, including $CO_2$, hydrogen sulfide and ammonia, which may be present in the geothermal fluid, is removed or flashed off. However, residual uncondensible gas including carbon dioxide, even under these conditions, remain in the geothermal fluid.

Thus, where the geothermal fluid introduced into the direct contact heat exchanger still contains uncondensible gas including $CO_2$, such uncondensible gas including the $CO_2$ is vented from the system following power generation, carrying along working fluid vapor, and thereby resulting in working fluid losses. Also, the presence of uncondensible gas including $CO_2$ usually results in reduced efficiency of power generation. Also, spent geothermal fluid or brine from the direct contact heat exchanger generally contains working fluid and uncondensibles including $CO_2$, and it is desirable to recover such working fluid, while removing any uncondensibles such as $CO_2$.

U.S. Pat. No. 4,084,379 discloses an energy source fluid such as geothermal fluid for the production of power in which direct heat transfer is utilized by the hot fluid source to vaporize a working fluid which is then used for the production of power. In such system the energy source fluid contains a small portion of the working fluid which is lost with the spent energy producing fluid. The dissolved working fluid is removed from the spent energy source fluid by adding a salt such as calcium chloride to saturate the water so as to lower the soluability of the working fluid in the energy producing fluid by a "salting out" effect, and thereby remove the dissolved working fluid and reduce working fluid losses. Uncondensible gases dissolved in the energy source fluid are pumped out of the system following the power generation step.

It is accordingly an object of the present invention to provide a process and system for recovery of energy from geothermal brine and hot water sources, having improved efficiency of operation. Another object is the provision of a process and system as described above, wherein uncondensible gas, particularly carbon dioxide, contained in the geothermal fluid, is removed from the process streams obtained from the geothermal fluid during power generation. A particular object of the present invention is the provision of a procedure and system employing direct contact heat exchange between a geothermal fluid or geothermal brine, and a working fluid such as a hydrocarbon, wherein the amount of uncondensible gas, particularly carbon dioxide, present in the geothermal fluid is substantially reduced during operation of the process for generation of power, by removal of the carbon dioxide for the process streams employing a chemical agent, to thereby reduce working fluid losses discharge from the system with carbon dioxide and other uncondensibles, and enhance power generating efficiency.

SUMMARY OF THE INVENTION

The above objects and advantages are achieved according to the invention by the provision of a process and system for removing carbon dioxide in geothermal power generating processes employing a geothermal fluid such as geothermal brine containing carbon dioxide, which comprises introducing an aqueous alkaline solution, as described in greater detail hereinafter, preferably an aqueous calcium hydroxide solution, into a fluid or vapor stream obtained from the brine during power generation, to react with this carbon dioxide to form a carbonate and to remove carbon dioxide from the stream. The removal of noncondensible gas such as carbon dioxide increases the efficiency of power generation, and particularly in the case of power generation by direct contact heat exchange between a geothermal fluid such as geothermal brine, and a working fluid such as isobutane, the removal of carbon dioxide from the working fluid stream, results in substantially reducing working fluid losses. The invention also can reduce the content of sulfur compounds (e.g., $H_2S$, $SO_3^{-2}$ and $SO_4^{-2}$) in the working fluid and in the vented gases from a geothermal power system.

The invention includes a process for removing carbon dioxide from a vapor stream containing carbon dioxide and generated from a geothermal fluid including geothermal brine in a geothermal energy recovery process, and comprises the steps of (a) introducing said vapor stream containing carbon dioxide into a condenser zone, and
(b) introducing an aqueous alkaline solution into said condenser zone into contact with said vapor stream, to thereby react with said carbon dioxide to form a carbonate, thereby removing said carbon dioxide from said vapor stream.

Thus, in the basic contact heat exchange system for the recovery of energy from geothermal brine or other hot water-containing sources, the geothermal brine from a well or other hot water-containing source, is introduced under pressure into a heat exchanger in direct contact with an immiscible working fluid such as isobutane. The resulting hot working fluid is expanded in an expander or turbine to produce work, and the expanded working fluid discharged from the turbine is condensed and the condensed working fluid is returned or recycled to the heat exchanger.

The cooled brine containing some entrained and/or dissolved working fluid is withdrawn from the heat exchange column and is fed to a flash drum to flash off working fluid contained in the brine withdrawn from the heat exchange column. The working fluid flashed off also contains uncondensibles including carbon dioxide.

The working fluid containing uncondensibles including carbon dioxide, according to one embodiment, is fed to a direct contact condenser and separator, and calcium hydroxide is sprayed into the contact condenser and separator to react with and remove carbon dioxide as calcium carbonate. The working fluid is then withdrawn from the condenser and separator, and is recycled to the direct contact heat exchanger.

An important feature of the invention is to control the degree of carbon dioxide removal by monitoring the extent of calcium carbonate scale build-up. Thus, it is desirable to remove as much carbon dioxide as possible from the working fluid stream until the point of detectable scale formation occurs. Scale formation can occur anywhere in the system but is more likely to occur and cause operation problems near or at the brine inlet to the direct contact heat exchanger vessel or in the pipeline downstream from the heat exchanger. If too much $CO_2$ is removed, it can cause an undesirable increase in calcium carbonate scale formation. The best mode of operation is to remove as much $CO_2$ as is economically practical in order to improve efficiency of power generation but not to remove so much $CO_2$ as to cause excessive scale formation. If too great an amount of $CO_2$ is removed, the pH rises due to removal of hydrogen ion. This increase in pH causes metal carbonate (as opposed to such bicarbonate) concentration and precipitation of calcium carbonate to increase, resulting in excessive carbonate concentration and formation of scale.

It should be noted that the working fluid will contain carbon dioxide and if this carbon dioxide is removed from the working fluid, the working fluid will pick up additional carbon dioxide from the brine. Therefore, the carbon dioxide in the working fluid can be determined by analysis and used as one of the indicia for control of all alkali metal hydroxide addition.

The precipitated calcium carbonate commences to deposit as scale in the pipeline or equipment due to improper operation, that is as a result of too much $CO_2$ removal. The calcium carbonate scale can be reduced or removed by decreasing the amount of $CO_2$ removal, so as to lower the pH and to decrease the calcium carbonate concentration, and thus aid to resolubilize the precipitated calcium carbonate.

The amount of $CO_2$ removal is monitored so that if more than a predetermined amount of scale build-up occurs, the amount of $CO_2$ removal is reduced by reducing the amount of calcium hydroxide employed. Generally from about 60 to about 80% of the $CO_2$ is removed to provide improved efficiency of power generation without causing excessive scale formation.

In another embodiment, direct contact heat exchange between the hot energy source fluid such as hot geothermal brine, and a working fluid is not employed, but rather the hot geothermal brine is flashed, and the flashed steam is utilized as the power fluid for a power generating turbine. The fluid discharged from the turbine and which contains uncondensible gas including carbon dioxide is introduced into a direct contact condenser and separator, and the alkaline solution, such as aqueous calcium hydroxide, can be sprayed into the direct contact condenser, to remove $CO_2$ by precipitation of calcium carbonate. Such carbon dioxide improved power generating efficiency by reducing the required pumping power for the system.

In a modification of the direct contact heat exchange process described above, employing a working fluid, after the working fluid has passed through the turbine for power generation, such working fluid can be cooled and condensed in a contact separator device or a condenser, and the alkaline solution, e.g., aqueous calcium hydroxide, can be introduced into the condenser for removal of uncondensible carbon dioxide, which is removed from the condenser as calcium carbonate. The separated working fluid is then recycled to the direct contact heat exchanger.

Alternatively, the aqueous alkaline solution, e.g., calcium hydroxide solution can be introduced as a spray or slurry into the geothermal brine prior to utilizing the brine in the power generating system, e.g., prior to flashing the geothermal brine and prior to introduction of the geothermal brine into a heat exchanger, e.g., a direct contact heat exchanger, to thereby substantially reduce the amount of carbon dioxide and the uncondensible gas in the geothermal brine, thereby reducing working fluid losses in the power generating portion of the system.

The alkaline agents or solutions which can be used to react with the carbon dioxide in the geothermal stream as described above, for removal of carbon dioxide, can be aqueous solutions of alkaline earth metal hydroxides such as calcium hydroxide solution or hydrated lime, barium hydroxide solution such as barium monohydrate solution, and magnesium hydroxide solution. The use of calcium hydroxide solution is economical and is preferred.

THE DRAWINGS

The above and other features and advantages of the invention will be more clearly understood by reference to the following detailed description of the invention, taken in connection with the accompanying drawing wherein.

Figure 3:
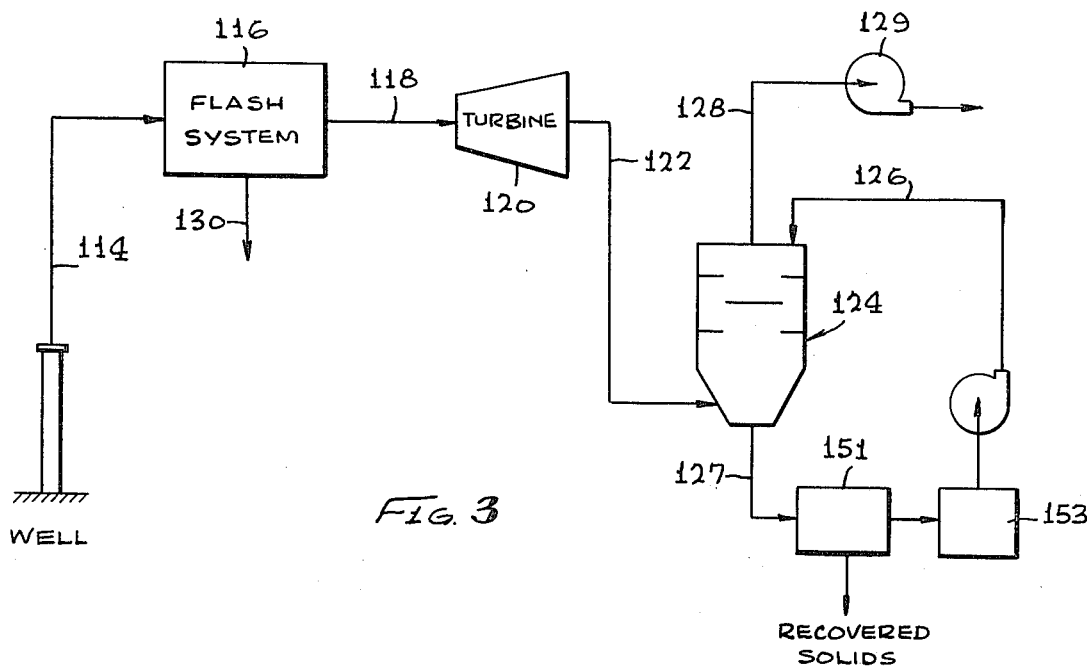
Figure 4:
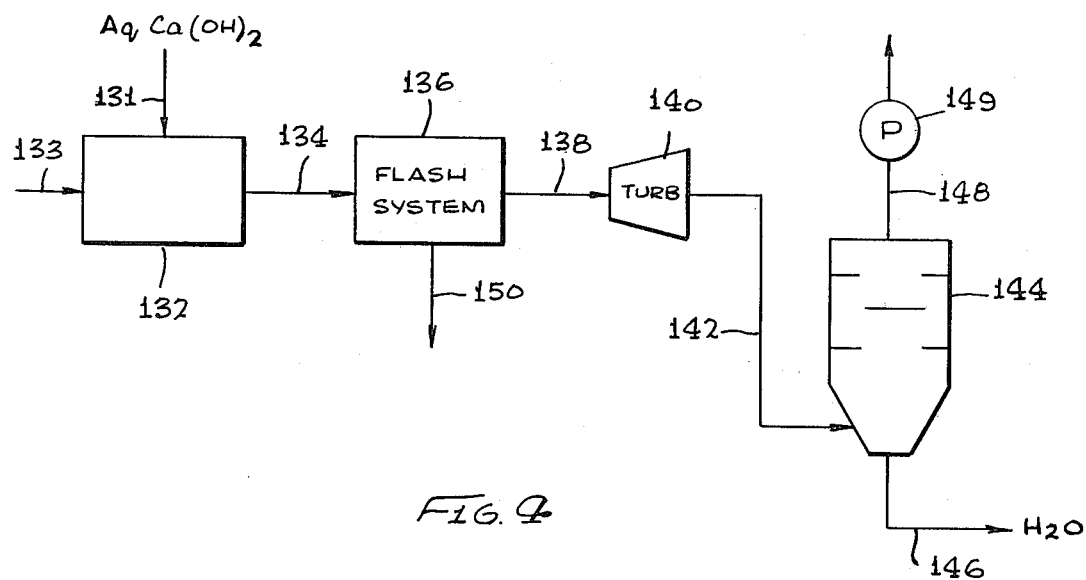

FIG. 3 is a schematic flow sheet of the application of the principle of carbon dioxide removal in a power generating system wherein geothermal brine is flashed, and the flashed gaseous fluid, following its use for power generation, is subjected to removal of carbon dioxide; and FIG. 4 is a schematic flow sheet of a modification of the system of FIG. 3, wherein $CO_2$ removal is applied to the geothermal fluid containing uncondensibles including $CO_2$, prior to flashing the geothermal fluid.

DESCRIPTION OF DETAILED EMBODIMENTS

Figure 1:
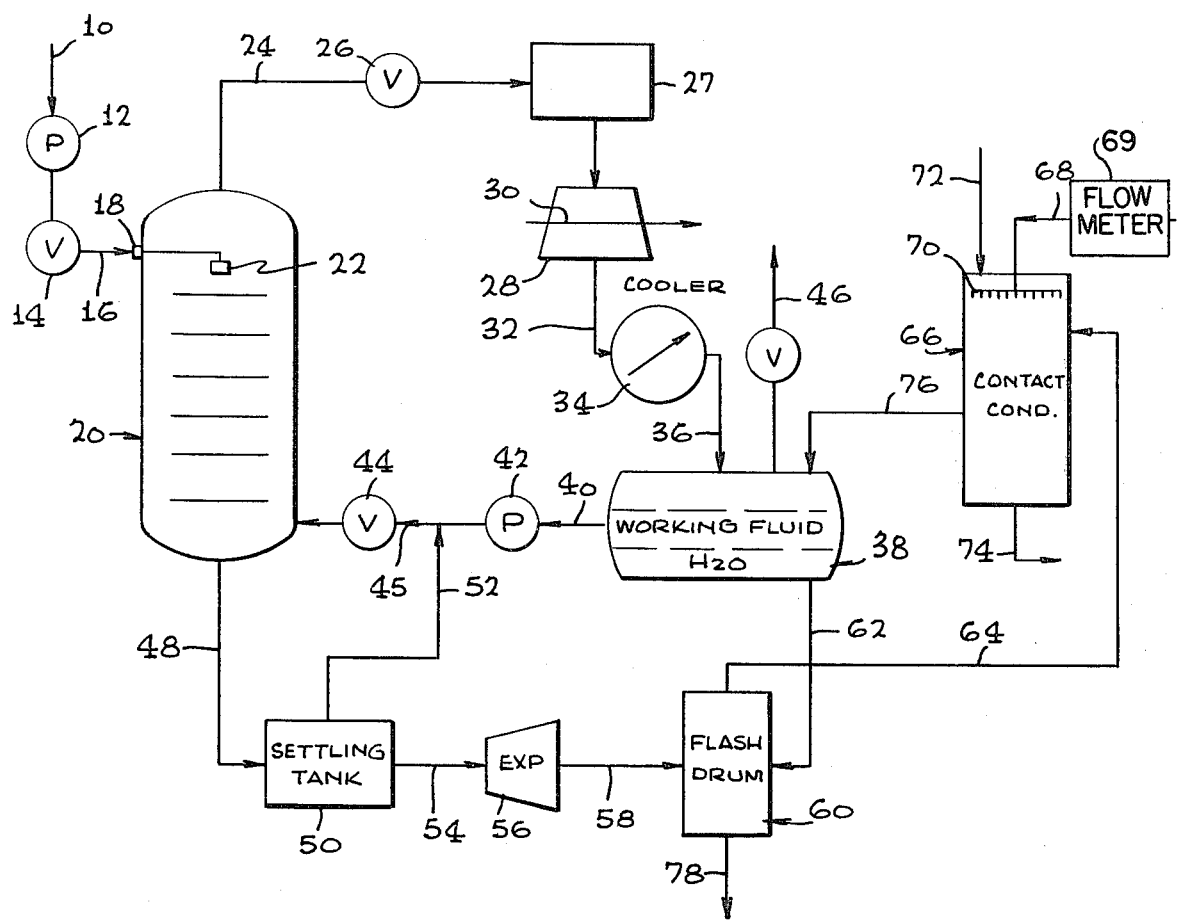
FIG. 1 is a schematic flow diagram showing the basic principle of $CO_2$ removal according to the invention, as applied to the direct contact heat exchange power generation system employing a working fluid and a direct contact heat exchanger.

Referring to FIG. 1 of the drawing, geothermal brine or hot water-containing fluid which may be degassed, as by steam stripping or flashing, to partially remove non-condensible gasses, enters through inlet means or conduit 10 and is passed to pump 12 which discharges via valve 14 and conduit 16 into an inlet 18, from which the hot water or brine is discharged into the top of heat exchanger column 20 in direct contact heat exchanger with a working fluid. The working fluid can be any suitable material which is immiscible with water, and such working fluid can have a density less than or greater than the density of the hot water containing fluid or brine, provided that the same density relation exists along the length of the column, so as to provide counter-current flow of working fluid and water-containing fluid such as brine in the column.

Thus, the working fluid can be a hydrocarbon including aromatics, paraffins, naphthalenes and olefins. Preferably, the working fluid is a paraffin or olefinic hydrocarbon containing from about 1 to about 8 carbon atoms, either straight or branched chain such as methane, ethane, propane, n-butane, isobutane, n-pentane, isopentane, neopentane, (2,2-dimethyl-propane), n-hexane, cyclohexane, n-heptane, n-octane, isooctane, and the analogous olefins such as n-butene, isobutene, and the like. Most desirably, paraffinic or olefininc hydrocarbons containing from about 3 to about 6 carbon atoms are employed. Aromatic hydrocarbons such as benzene, toluene, and xylene also can be used.

Mixtures of such hydrocarbons can also be utilized, such as, for example, a mixture of methane and ethane, ethane and propane, or propane and n-butane, to optimize the critical temperature and pressure conditions of the working fluid, and thereby obtain maximum energy recovery from the geothermal brine or hot water feed.

Working fluids other than hydrocarbons are also suitable provided they at least have the proper density relation to the hot aqueous fluid or brine as noted above and are immiscible.

A particularly preferred working fluid is isobutane.

Inlet temperature of the hot water or brine to the top of the column ranges from about 150° to about 600° F., with a range of about 300° to about 500° F., e.g., about 400° F. being customary for hot geothermal brine. Although the heat exchange column 20 can be operated above, or below, or at the critical conditions of the working fluid, in one embodiment the heat transfer column is operated above the critical pressure of the working fluid in the top of the column, such pressure preferably ranging from about 450 psia to about 1,000 psia, usually from about 500 to about 700 psia. The working fluid is heated in heat exchange column 20 by direct contact with the incoming hot brine or hot water. For this purpose, to introduce hot brine into the heat exchanger, an inlet nozzle 22 can be provided at the top of the column.

According to one specific example, the geothermal brine is pumped to a pressure of about 600 psia by pump 12 and enters the heat exchange column 20 at a temperature of about 350° F.

In the system illustrated in FIG. 1, the working fluid passing upwardly in the column from the bottom thereof, counter-current to the flow of feed brine or water, causes heat to be transferred from the hot brine to the cold working fluid, and the hot working fluid in the top of the column, e.g., at 600 psia and 300° F. is passed through conduit 24, via valve 26, and through a fine particulate material removal unit 27, e.g., fine wire mesh, which can be wet or dry, to a work expander 28, where the heated working fluid expands to produce work which is transferred through shaft 30, e.g., to an electrical generator. The discharged, expanded working fluid is then passed via conduit 32 to a cooler or condenser 34.

The condensed working fluid including any uncondensible gas is then fed through conduit 36 to an accumulator 38. In the accumulator condensed working fluid is separated from water vapor condensate and the condensed working fluid in the accumulator is removed through line 40 and through pump 42 to pressurize the working fluid approximately to the pressure in heat exchanger column 20 and the pressurized working fluid is then fed via valve 44 to the bottom portion of the heat transfer column 20, to be reheated therein.

Any uncondensed gas (which can contain some working fluid) is vented at 46 from the accumulator 38.

The above direct contact heat exchange process and system is described particularly in above Ser. No. 76,677, which is a continuation of above Ser. No. 589,068.

Cooled brine or water at 48 in the bottom of the heat transfer column, and which is still at elevated temperature, e.g., at 160° F. and at 600 psia, and which contains dissolved and/or entrained working fluid, e.g., isobutane, and dissolved or entrained uncondensed gas including carbon dioxide, is fed to a liquid separator 50, in the form of a settling tank for recovery of the working fluid. In the liquid separator 50, settling of the cooled brine takes place for recovery of a portion of the working fluid in liquid form. The recovered portion of working fluid is withdrawn from the separator or settling tank 50, at 52, and is returned via line 45 and valve 44 to the heat exchanger column 20.

The brine or water in the separator 50 is discharged at 54 to a turbine 56 for recovery of power, while dropping the pressure of the discharged brine at 58 to 150 psia, approximately or slightly higher than the pressure in the accumulator 38. The brine or water in line 58 is introduced at 62 into the flash drum 60. Water separated in the accumulator 38, and which may also contain dissolved working fluid, is also introduced at 62 into the flash drum 60. In the flash drum 60, additional working fluid, e.g., isobutane, entrained and/or dissolved in the brine or water is boiled from the solution and flows overhead, together with uncondensed gas including carbon dioxide, via conduit 64, and is introduced into the direct contact condenser and separator 66. Lime or aqueous calcium hydroxide solution, e.g., a 5 wt % of calcium hydroxide solution, is introduced via line 68 into a spraying unit 70 at the top of the direct contact condenser 66, and into direct contact with the mixture of working fluid and uncondensible gas including carbon dioxide in the condenser. Alternatively, the calcium hydroxide solution can be introduced into the cooling water which goes with the direct contact condenser. Such condenser can be maintained as the desired temperature by cold water from a cooling tower (not shown) entering the condenser at 72 and discharged at 74 for return to the cooling tower.

The amount of calcium hydroxide solution sprayed into the contact condenser or separator 66 is monitored by a flow meter 69 which is controlled by measuring the pH of the brine coming out of the direct contact heat exchanger. For a given brine composition and temperature a pH range can be experimentally determined within which the tendency to scale in a given system is minimized. This pH is primarily a function of the dissolved $CO_2$ in the brine. The amount of $CO_2$ in the working fluid influences the amount of $CO_2$ in the exiting brine. The spray removes some of the carbon dioxide present (e.g., 60 to 80% removal) in the uncondensible gas entering the condenser 66. This maintains the pH of the aqueous solution in the condenser 66 sufficiently low so as to maintain the calcium carbonate formed essentially in solution and without any excessive calcium carbonate scale formation on the walls of the condenser.

The condensed working fluid in the condenser 66 and some uncondensed gas containing a substantially reduced carbon dioxide content is passed via line 76 to the accumulator 38, and the uncondensed gas is vented at 46.

As a result of the substantial reduction of carbon dioxide in the working fluid recycled via 76 to the accumulator 38, the amount of uncondensible gas including carbon dioxide vented from the accumulator is substantially reduced, thereby substantially reducing working fluid losses.

Spent and cooled brine, e.g., at a temperature of about 140° F. is discharged at 78 from the flash drum 66 and can be used for recovery of the low quality heat therein or the waste brine can be discharged to a dump or reinjected in a brine well.

Figure 2:
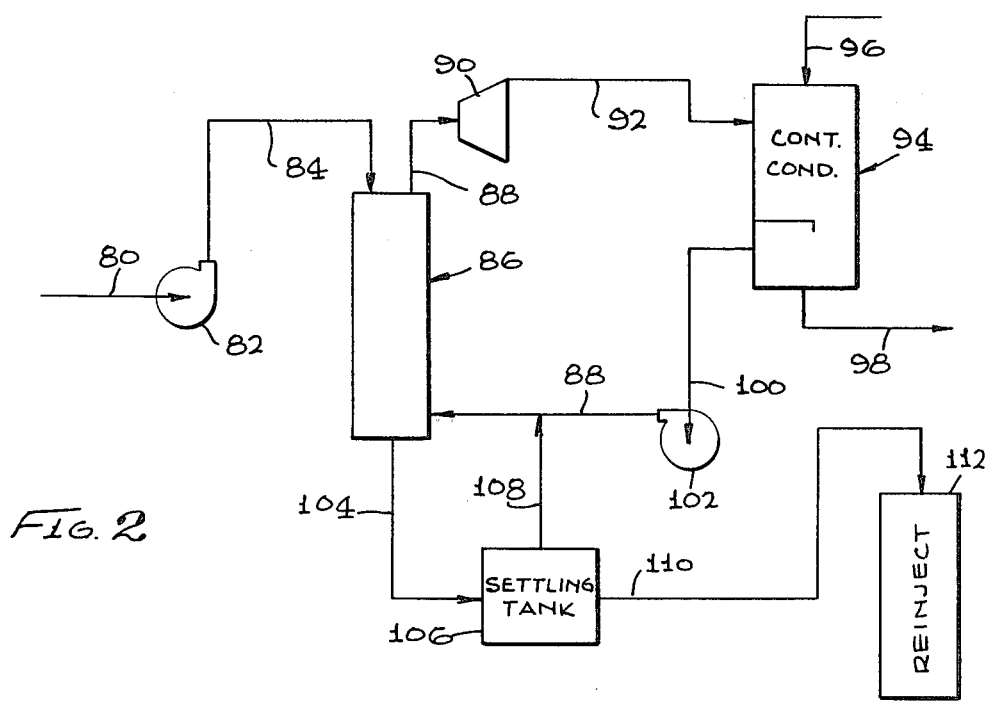
FIG. 2 is a schematic flow sheet of a modification of the system shown in FIG. 1.

In the modification shown in FIG. 2, geothermal brine at 80 is pumped at 82, through conduit 84 into a direct contact heat exchanger 86, in direct contact heat exchange with a working fluid as described above, and introduced at the bottom of the direct contact heat exchanger via line 88.

Hot vaporized working fluid withdrawn from the top of heat exchanger 86, and containing uncondensible gas including carbon dioxide is fed at 88 to a work expander 90.

The discharged vapor mixture of working fluid and uncondensible gas including carbon dioxide is passed via line 92 to a contact condenser 94. An aqueous solution of calcium hydroxide is introduced at 96 into the condenser 94 in direct contact with the mixture of working fluid and uncondensible gas including carbon dioxide, the working fluid being condensed and the calcium hydroxide solution introduced into the condenser 94 reacting with the carbon dioxide in the uncondensible gas, thus removing the carbon dioxide by formation of calcium carbonate. Here again, the amount of calcium hydroxide solution is monitored so that the amount of calcium carbonate formed is insufficient to form calcium carbonate scale on the inside surfaces of the process equipment. Spent aqueous slurry containing calcium hydroxide and calcium carbonate is removed from the condenser at 98. The working fluid containing carbon dioxide dissolved or entrained therein, is discharged via line 100 and is pumped at 102 up to the pressure in the direct contact heat exchanger 86, and introduced via line 88 into the heat exchanger.

The spent brine discharged from the bottom of the heat exchanger is fed via line 104 to a recovery unit 106, such as a settling tank, for recovery of working fluid, as at 50 and 52 in FIG. 1, and recycling of such fluid via lines 108 and 88 to the direct contact heat exchanger 86.

Spent brine discharged from the working fluid recovery unit 106, is discharged therefrom at 110 and reinjected at 112 into a brine well.

Now referring to FIG. 3 of the drawing, there is shown a flash system for flashing geothermal brine for power generation. In this embodiment, hot geothermal brine at 114 from a geothermal well and at a pressure, e.g., of about 600 psia is introduced into a flash system such as a flash drum 116. The flash stream containing uncondensible gas including carbon dioxide, is fed at 118 to a work expander turbine 120, and the steam discharge from the turbine at 122, and at reduced pressure, and containing uncondensible gas including $CO_2$ is introduced into a contact condenser 124. An aqueous solution of 5 wt % calcium hydroxide is introduced at 126 into the contact condenser, the amount of calcium hydroxide being monitored to react with the major portion of carbon dioxide in the contact condenser, converting it to calcium carbonate. The amount of calcium hydroxide solution employed is predetermined to minimize calcium carbonate scale formation in the condenser, and to maintain calcium carbonate substantially in solution. A slurry of excess calcium hydroxide and calcium carbonate is discharged from the contact condenser at 126. A slurry 127 containing cooling water and solid alkali metal carbonates is removed from the bottom of the contact condenser 124 and separated in a separation section 151 where the solids are recovered and the liquid is sent to a cooling tower and then pumped back to the condenser 124. Remaining uncondensible and inert gases containing some carbon dioxide is vented by means of a vacuum pump 129 from the contact condenser at 128.

The brine at reduced temperature is discharged at 130 from the flash system 116. Such brine at 130 can be sent to disposal. However, if the brine at 130 is of sufficiently high temperature, additional heat can be removed from the brine by direct contact heat exchange with a working fluid, as shown in FIGS. 1 and 2 above, or such brine can be heat exchanged with a working fluid in a tube and shell heat exchanger, or alternatively, such brine can be processed in a process and system as described in U.S. Application Ser. No. 50,868 filed June 21, 1979 by P. Sadhukhan, now U.S. Pat. No. 4,272,961, which is a continuation of Application Ser. No. 861,907, filed Dec. 19, 1977 now abandoned.

The process and system illustrated in FIG. 3, substantially reduces the pumping power required for removal of units at 128 from the system.

FIG. 4 is a modification of the process and system of FIG. 3, but wherein the calcium hydroxide solution is introduced into the hot geothermal brine for removal of $CO_2$. Referring to FIG. 4, hot geothermal brine at 130, containing uncondensible gas including $CO_2$ entrained or dissolved therein, is introduced at 131 into a tank at 132. A sufficient amount of aqueous calcium hydroxide, or its equivalent as noted above, is introduced, e.g., as by spraying, into the tank 132 in contact with the entire body of geothermal brine. The amount of calcium hydroxide introduced is monitored so that the major portion, e.g., 60 to 80%, of the carbon dioxide dissolved or entrained in the brine is converted to calcium carbonate, the amount of calcium hydroxide introduced being controlled so as to prevent formation of any substantial amount of scale on the walls of tank 132.

The resulting hot geothermal brine containing a substantially reduced amount of carbon dioxide is passed via conduit 134 to a flash drum 136, wherein the hot geothermal brine is flashed to flash off steam containing only a small amount of carbon dioxide, which is fed at 138 to a work expander or turbine 140 for generation of electrical power. The discharge from the turbine comprising steam at reduced pressure and uncondensible gas containing only a small amount of $CO_2$ is passed via conduit 142 to a contact condenser 144. Water is discharged from the condenser at 146 and inert uncondensible gas containing the above noted small or trace amount of $CO_2$ is discharged at 148 by means of vacuum pump 149.

The waste or spent brine discharged at 150 from the flash drum 136, can be processed for extracting available heat energy remaining in the brine, as by introducing such waste brine into a direct contact heat exchange process as in FIG. 1 or 2, or into a tube and shell heat exchanger in contact with the working fluid, or utilized in the process of the above Sadhukhan application. The removal of the major portion of carbon dioxide present in the hot brine according to the process and system of FIG. 4 substantially reduces the amount of carbon dioxide in the vent gas from the system, and thus reduces the required pumping power at 149.

The hot geothermal brine or other hot water source may also contain dissolved or entrained therein a small amount of hydrogen sulfide and may also contain a small amount of ammonia. Although addition of an alkaline solution such as calcium hydroxide solution may result in the precipitation of a metal sulfide, the amount so formed is so small that it may only amount to about 0.1 to about 1% of the amount of calcium carbonate formed, and it is not detrimental. If ammonia is present in the hot geothermal brine, the amount is so small as not to interfere with the operation of the process and system of the invention for removal of carbon dioxide.

From the foregoing, it is seen that the invention provides a novel process and system for removal of carbon dioxide present in geothermal brines employed for power generation, resulting in reduction of working fluid losses in direct contact heat exchange processes employing geothermal brine in heat exchange relation with a working fluid, and also achieves improved efficiency of power generation, utilizing a smaller amount of pump power, e.g., for removing vent gasses.

While I have discribed particular enbodiments of my invention for purposes of illustration, it will be understood that various changes and modifications within the spirit of the invention can be made and the invention is not to be taken as limited except by the scope of the appended claims.

What I claim is:

1. A process for removing carbon dioxide from a vapor stream containing carbon dioxide and a working fluid, said vapor stream being generated from a geothermal fluid in a geothermal energy recovery process, said process for removing carbon dioxide comprising:
   (a) introducing said vapor stream containing carbon dioxide into a condenser zone;
   (b) introducing an aqueous alkaline solution into said condenser zone into contact with said vapor stream, to react with said carbon dioxide to form a carbonate and remove said carbon dioxide from said vapor stream;
   (c) condensing said working fluid; and, (d) passing said condensed working fluid having a reduced content of carbon dioxide into heat exchange relation with said geothermal fluid.

2. A process for removing carbon dioxide from a vapor stream containing carbon dioxide and generated from a geothermal fluid in a geothermal energy recovery process, said process for removing carbon dioxide comprising:
   (a) introducing said vapor stream containing carbon dioxide into a condenser, and
   (b) introducing an amount of aqueous alkaline solution into said condenser zone into contact with said vapor stream, to react with said carbon dioxide to form a carbonate and remove said carbon dioxide from said vapor stream, said aqueous alkaline solution being an aqueous alkaline earth metal hydroxide solution selected from the group consisting of aqueous solutions comprising calcium hydroxide, barium hydroxide, magnesium hydroxide and mixtures thereof, said amount of introduced aqueous alkaline earth metal hydroxide solution being sufficient to remove a substantial portion of said carbon dioxide from said vapor stream, but insufficient to form excessive scale formation in said condensor.

3. The process as defined in claim 2, wherein the amount of said introduced aqueous alkaline earth metal hydroxide solution is monitored so as to remove about 60 to about 80% of said carbon dioxide from said vapor stream.

4. The process as defined in claim 2, said aqueous alkaline earth metal hydroxide solution being an aqueous solution comprising calcium hydroxide.

5. The system as defined in claim 2, including means for monitoring the amount of aqueous alkaline earth metal hydroxide solution so as to provide an amount of said solution sufficient to remove a substantial portion of said carbon dioxide from said uncondensible gas.

6. In a system for recovery of energy from a geothermal fluid containing uncondensible gas including $CO_2$, including a heat exchange column for direct contact heat exchange between said geothermal fluid and an immiscible working fluid, means for expanding the resulting heated working fluid to produce work, condenser means for condensing the expanded working fluid, means for returning the condensed working fluid to said exchange column, means for withdrawing the cooled geothermal fluid containing working fluid and uncondensible gas as including $CO_2$ from said heat exchange column, and means for flashing said cooled geothermal fluid to flash off a mixture of working fluid vapor and uncondensible gas including $CO_2$, the improvement which comprises in combination
   (a) a second condenser,
   (b) means for introducing said mixture into said second condenser,
   (c) means for introducing an aqueous alkaline earth metal hydroxide solution into said condenser into contact with said working fluid and uncondensible gas including said $CO_2$, to thereby react with said $CO_2$ to form calcium carbonate and remove said $CO_2$ from said working fluid, (d) means for returning said condensed working fluid from said second condenser to said heat exchange column, and (e) means for venting uncondensible gas from said second condenser.

7. In a process for recovering energy from a geothermal fluid comprising geothermal brine and an uncondensible gas including $CO_2$, the process including; introducing said geothermal fluid into a heat exchange column through an inlet section in direct heat exchange relation with an immiscible working fluid in liquid form, expanding the resulting heated working fluid to produce work, condensing the expanded working fluid in a condenser, returning the condensed working fluid to said heat exchange column; and withdrawing cooled geothermal fluid containing working fluid and uncondensible gas including $CO_2$ from said heat exchange column and flashing said cooled geothermal fluid to flash off a mixture of working fluid vapor and uncondensible gas including $CO_2$; the improvement for removal of $CO_2$ from said uncondensible gas which comprises:

(a) introducing said mixture into a second condenser, to condense said working fluid, (b) introducing an aqueous alkaline earth metal hydroxide solution into said second condenser into contact with said working fluid and said uncondensible gas including $CO_2$, to react with at least some of the $CO_2$ to form an alkaline earth metal carbonate and remove said $CO_2$ from said working fluid, (c) returning said condensed working fluid from (a) to said heat exchange column, and (d) venting the uncondensible gas from said second condenser.

8. The process as defined in claim 7, said aqueous alkaline earth metal hydroxide solution being selected from the group consisting of aqueous solutions of calcium hydroxide, barium hydroxide and magnesium hydroxide.

9. The process as defined in claim 7 and employing an amount of said aqueous alkaline earth metal hydroxide solution sufficient to remove a substantial portion of said carbon dioxide from said vapor stream, but insufficient to cause formation of excessive scale deposits at or near the inlet section of the heat exchange column.

10. The process as defined in claim 7, said aqueous alkaline earth metal hydroxide solution being an aqueous calcium hydroxide solution, the amount of said calcium hydroxide solution employed being monitored to remove about 60 to about 80% of said carbon dioxide from said uncondensible gas.

11. The process as defined in claim 7, including an accumulator zone, said expanded and condensed working fluid being introduced into said accumulator zone prior to returning said expanded and condensed working fluid to said column, and including also passing said condensed working fluid from said second condenser to said accumulator zone prior to returning said second condensed working fluid to said column.

12. The process for recovery of energy from a hot geothermal fluid containing uncondensible gas including carbon dioxide, which comprises (a) introducing said geothermal fluid under pressure into a heat exchange column in direct heat exchange relation with an immiscible working fluid in liquid form, (b) expanding the resulting heated working fluid to produce work, (c) condensing the expanded working fluid in a condenser, (d) passing said condensed working fluid to an accumulator zone, (e) returning the condensed working fluid from said accumulator zone to said heat exchange column, (f) withdrawing waste geothermal fluid containing working fluid and uncondensible gas including carbon dioxide from said heat exchange column, (g) introducing said geothermal fluid into a separator to separate liquid working fluid, (h) returning said separated working fluid to said heat exchange column, (i) withdrawing waste geothermal fluid containing uncondensible gas including $CO_2$ from said liquid separator, (j) expanding said waste geothermal fluid in an expander, (k) introducing expanded waste geothermal fluid containing additional working fluid and uncondensible gas including carbon dioxide into a flash drum, (l) flashing said geothermal fluid to flash off a mixture of working fluid and carbon dioxide, (m) introducing said mixture into a contact condenser, and condensing the working fluid, (n) introducing an aqueous solution of calcium hydroxide into said contact condenser to react with the carbon dioxide to form calcium carbonate, and remove said carbon dioxide, (o) withdrawing working fluid from said contact condenser, (p) introducing said working fluid into said accumulator, and (q) withdrawing waste brine from said flash drum.

13. A system for recovery of energy from a geothermal fluid including geothermal brine including in combination, (a) a heat exchange column for direct contact heat exchange between said hot geothermal fluid and an immiscible hydrocarbon working fluid, (b) expander means for expanding the resulting heating working fluid to produce work, (c) a first condenser means for condensing expanded working fluid, (d) an accumulator for separating working fluid and condensed water vapor, (e) means for withdrawing working fluid from said accumulator, (f) pumping means for pumping said withdrawn working fluid up to the pressure of said heat exchange column, (g) means for introducing said pumped working fluid into said heat exchange column, (h) means for withdrawing geothermal fluid containing working fluid and uncondensible gas including carbon dioxide from said heat exchange column, (i) means for settling said withdrawn geothermal fluid to separate working fluid therefrom, (j) means for returning said working fluid to said heat exchange column, (k) a second work expander, (l) means for feeding said geothermal fluid from said settling means to said second expander, (m) flash drum means, (n) means for introducing said expanded geothermal fluid from said second expander to said flash drum means, (o) a contact condenser, (p) means for introducing the flashed mixture of working fluid and uncondensible gas including $CO_2$ into said contact condenser, to condense said working fluid therein, (q) means for introducing a calcium hydroxide solution into said contact condenser and into contact with said working fluid and uncondensible gas including $CO_2$, to thereby react with said $CO_2$ to form calcium carbonate and removing said $CO_2$ from said working fluid, and (r) means for passing said working fluid from said contact condenser to said accumulator.

14. The system as defined in claim 13, including means for monitoring the amount of aqueous calcium hydroxide introduced into said contact condenser so that the amount of said aqueous calcium hydroxide solution introduced into said contact condenser is sufficient to remove a substantial portion of said carbon dioxide from said uncondensible gas, but insufficient to form excess scale in the system.

* * * * *